(No Model.)
G. W. CRESSMAN.
RAG ENGINE.
No. 289,235. Patented Nov. 27, 1883.
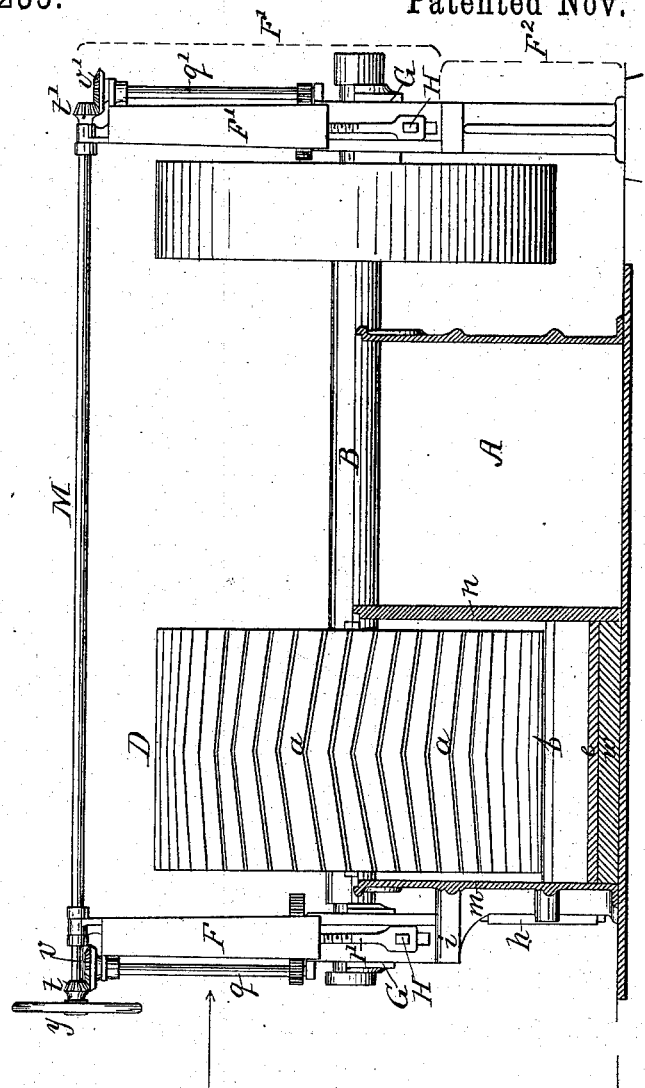
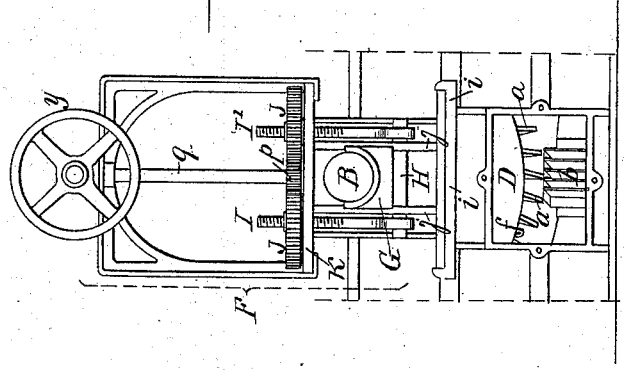
WITNESSES:
James F. Johns
David Williams
INVENTOR:
George W. Cressman
by his Attorneys
Howson & Sons (No Model.) G. W. CRESSMAN. 2 Sheets—Sheet 2.
RAG ENGINE.
No. 289,235. Patented Nov. 27, 1883.
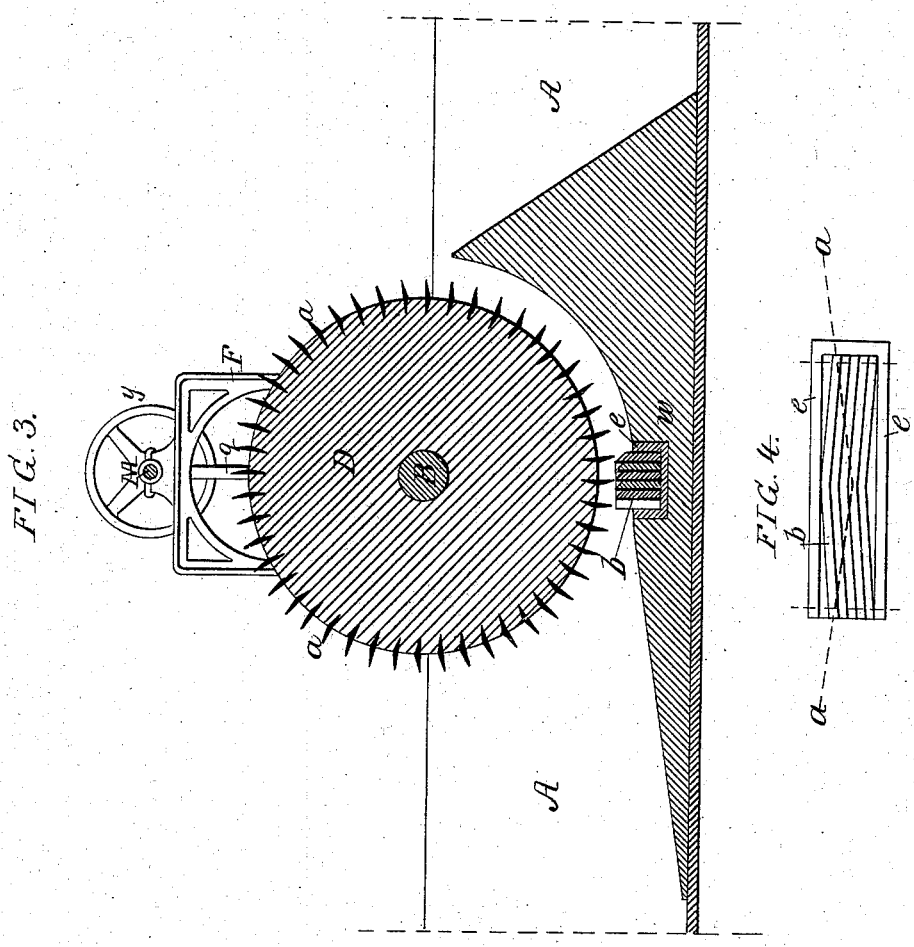
WITNESSES:
James F. Tobin
David Williams
INVENTOR:
George W. Cressman
by his Attorneys
Howson & Sons

UNITED STATES PATENT OFFICE.

GEORGE W. CRESSMAN, OF BARREN HILL, PENNSYLVANIA.

RAG-ENGINE.

SPECIFICATION forming part of Letters Patent No. 289,285, dated November 27, 1883.

Application filed September 4, 1883. (No model.)

*To all whom it may concern:*

Be it known that I, GEORGE W. CRESSMAN, a citizen of the United States, residing in Barren Hill, Montgomery county, Pennsylvania, have invented certain Improvements in Rag-Engines, of which the following is a specification.

My invention consists, mainly, of the combination of the main shaft and cylinder of a rag-engine with mechanism for raising and lowering the said shaft and effecting the nice adjustment of the blades of the cylinder in respect to the fixed blades.

My invention further consists in so constructing the trough of a rag-engine that facilities will be afforded for withdrawing and replacing the fixed blades; also, in combining a cylinder having angular blades with fixed angular blades for the purpose of increasing their disintegrating effect on the rags.

In the accompanying drawings, Figure 1, Sheet 1, is a transverse section of a rag-engine with my improvements; Fig. 2, a side view of part of the engine, looking in the direction of the arrow, Fig. 1; Fig. 3, Sheet 2, a longitudinal section of part of the engine; and Fig. 4, a diagram illustrating the action of the angular blades.

It has not been deemed necessary to show the entire trough A of the rag-engine, as it is of the usual oblong form. Across the upper edges of the trough extends the shaft B, to which is secured the cylinder D, provided with blades $a$ for operating in connection with a series of fixed angular blades, $b$. Both the cylinder-blades and fixed blades, instead of being straight, as usual, are angular, as and for the purpose explained hereinafter.

I may refer here to that feature of my invention by which the removing and replacing of the fixed blades $b$ is facilitated. These blades and intervening packing-strips are fitted into a box, $e$, extending across that portion of the trough in which the cylinder revolves—that is, across the space between the side $m$ of the trough and the usual partition, $n$—the box being fitted into the base $w$, as best observed in Fig. 3. In the side $m$ of the trough there is an opening, $f$, (shown in Fig. 2,) provided with a removable cover-plate, $h$, after detaching which from the side $m$ of the trough one end of the box and the outer ends of the blades and packing-pieces will be exposed, and either the box with the whole of the blades and packing-pieces or one or more of the blades and packing-pieces without the box may be withdrawn through the said opening.

I will now proceed to describe the mechanism for raising and lowering the shaft B and its cylinder D.

To a bracket, $i$, projecting from and preferably forming a part of the side $m$ of the trough A, is secured the base of a frame, F, the ribs $j\ j$ of which form guides for the bearing G of one of the journals of the shaft B, these ribs being vertically slotted to receive and guide the cross-bar H, on which the said bearing rests. Two screw-rods, I I', are connected at their lower ends, one rod to one end and the other rod to the opposite end of the said cross-bar H, the threaded portion of each rod being adapted to the internally-threaded hub of a cog-wheel, J, and the hubs of the two wheels bearing on the horizontal portion K of the frame F. The two wheels are geared together by a pinion, $p$, on a vertical shaft, $q$, which has its bearings in projections on the frame F. At a distance from the trough A is a second frame, F', which is similar to the frame F, excepting that the frame F' has a pedestal, $F^2$, secured to a suitable foundation. This frame F' has a guided bearing, G', for the second journal of the shaft B, and this bearing is supported by a cross-bar attached to two screw-rods adapted to the hubs of two cog-wheels, precisely as described above, these cog-wheels being geared together by a pinion on a vertical shaft, $q'$. The two shafts $q$ and $q'$ are geared together by a horizontal shaft, M, bevel-pinions $t\ t'$, and bevel-wheels $v\ v'$, as too clearly shown in Fig. 1 to need more minute description, the said shaft M being provided with a hand-wheel, $y$, by turning which the shaft B and its cylinder D may be raised and lowered as the required adjustment of the blades of the cylinder in respect to the fixed blades may suggest.

It will be seen that the shaft B and its cylinder are suspended to the two frames F F' through the medium of the bearings G G', cross-bars H, screw-rods I I', and wheels J, the weight of the shaft and cylinder always maintaining the cog-wheels in contact with the frame, so that the nice adjustment of the blades of the cylinder in respect to the fixed blades can be effected by the mechanism described.

The relation of the blades of the cylinder to the fixed blades is shown in Fig. 4, which represents a plan view of the box *e*, containing the angular blades *b* and intervening packing-pieces, the dotted line indicating the edge of one of the angular blades of the cylinder. It will be understood that the disintegration of the rags, due to the joint action of these angular blades, is more effective and rapid than when the blades are straight, and there is the additional advantage of the self-sharpening of the blades.

I claim as my invention—

1. The combination of the cylinder and shaft of a rag-engine, and two vertically-adjustable bearings for the said shaft, with two screw-rods and two cog-wheels, which serve as nuts for the rods, and by which each bearing is suspended to a suitable frame, and with gearing, whereby the whole of the said wheels may be simultaneously operated, substantially as set forth.

2. The combination of the cylinder and fixed blades of a rag-engine with a trough having in one side an opening, through which the said blades may be withdrawn, as set forth.

In testimony whereof I have signed my name to this specification in the presence of two subscribing witnesses.

GEORGE W. CRESSMAN.

Witnesses:
HARRY L. ASHENFELTER,
HENRY HOWSON, Jr.